United States Patent [19]

Ishidoh et al.

[11] Patent Number: 4,710,921
[45] Date of Patent: Dec. 1, 1987

[54] DIGITAL SIGNAL TRANSMITTING SYSTEM

[75] Inventors: Takanobu Ishidoh; Yoshiyuki Kondoh, both of Tokyo, Japan

[73] Assignee: Sony Corporation, Tokyo, Japan

[21] Appl. No.: 751,871

[22] Filed: Jul. 5, 1985

Related U.S. Application Data

[63] Continuation-in-part of Ser. No. 737,518, May 23, 1985, abandoned.

[51] Int. Cl.[4] ............................................. H04J 3/12
[52] U.S. Cl. .................................. 370/110.1; 380/20; 380/43
[58] Field of Search ...................... 370/110.1, 111, 105; 178/22.13, 22.17; 358/122; 380/20, 43, 48

[56] References Cited

U.S. PATENT DOCUMENTS

| | | | |
|---|---|---|---|
| 3,341,660 | 9/1967 | Duerdoth | 370/110.1 |
| 3,359,373 | 12/1967 | Anderson et al. | 370/110.1 |
| 3,873,776 | 3/1975 | Smith et al. | 370/110.1 |
| 3,936,609 | 2/1976 | Waldeck | 370/110.1 |
| 4,176,246 | 11/1979 | Gaetzi | 178/22.13 |
| 4,369,443 | 12/1979 | Giallanza et al. | 340/825.47 |
| 4,531,020 | 7/1982 | Wechselberger et al. | 178/22.08 |

Primary Examiner—Douglas W. Olms
Attorney, Agent, or Firm—Lewis H. Eslinger; Alvin Sinderbrand

[57] ABSTRACT

A digital signal transmitting system includes a digital signal generator, such as, an A/D (analog-to-digital) converter, for producing digital information signals representing music or data, and a control signal generator for producing a frame synchronizing signal and service bit signals which are time division-multiplied with the digital information signals for producing a composite digital signal. Further, a terminal number and a scramble key code are time division-multiplexed on the service bits within each different frame of the composite digital signal so as to make available the scramble key code at a terminal unit or receiving side of the system.

10 Claims, 18 Drawing Figures

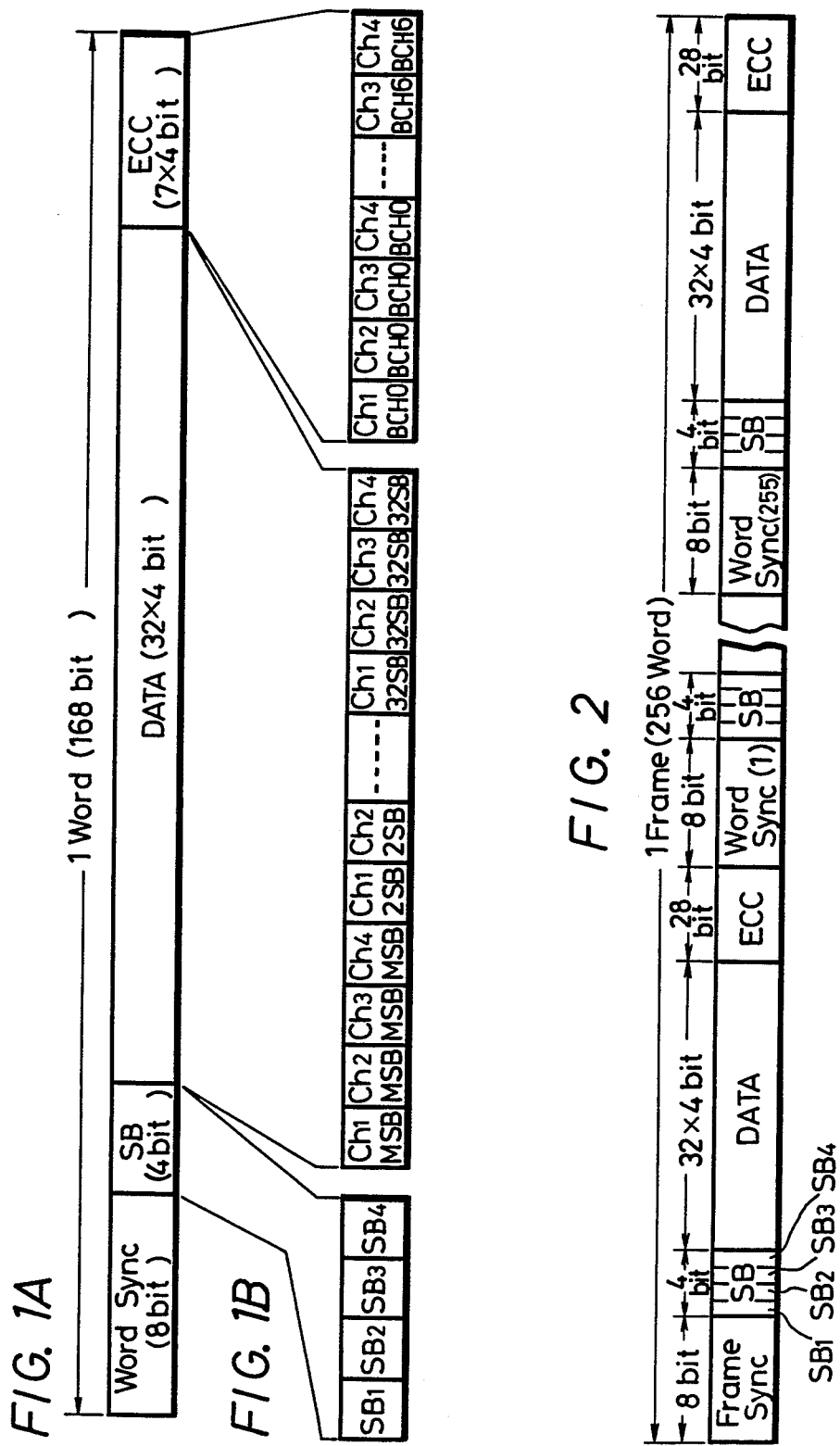

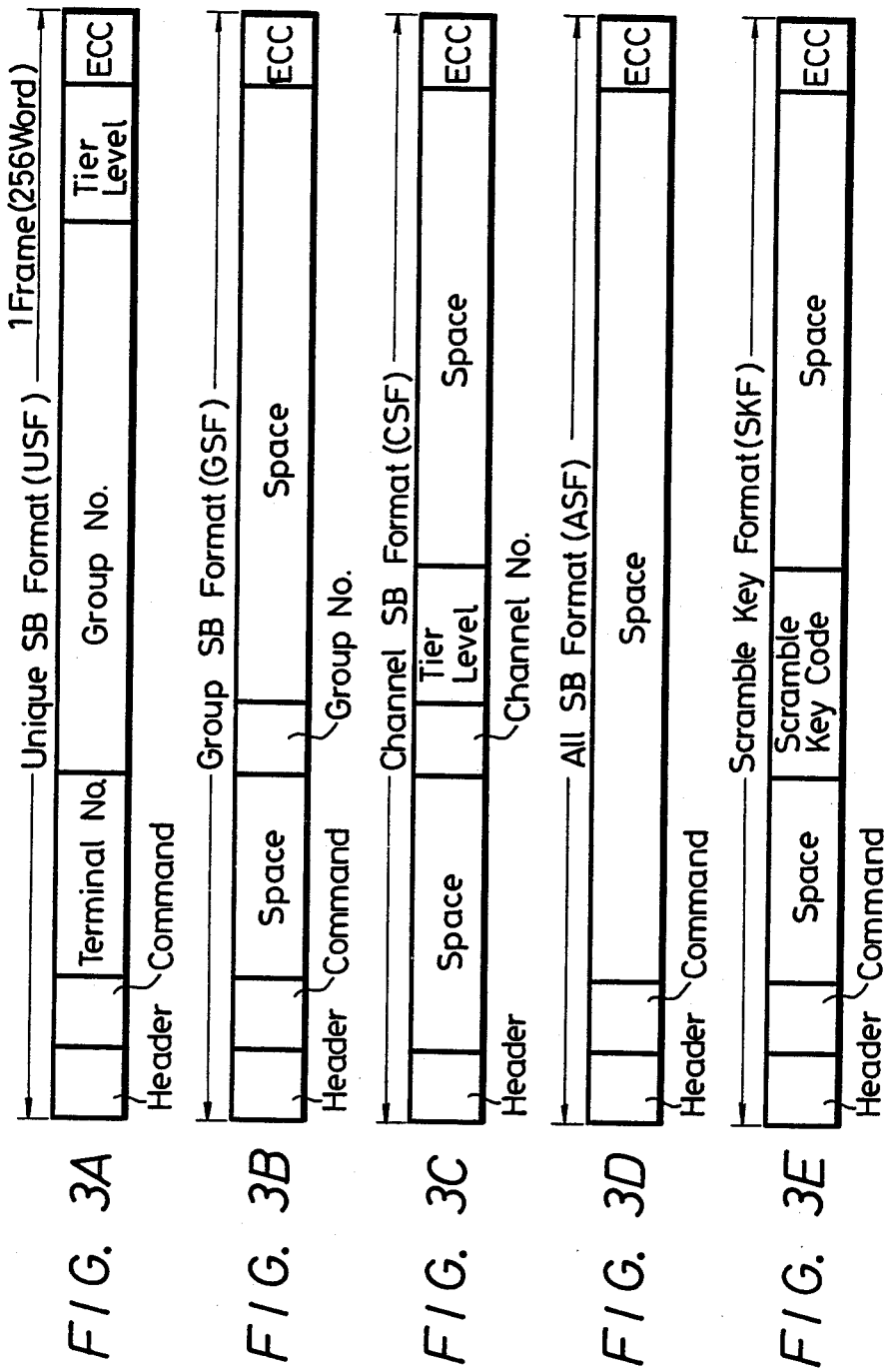

DIGITAL SIGNAL TRANSMITTING SYSTEM

Related Application

This application is a continuation-in-part of applicant's copending U.S. patent application Ser. No. 06/737,518, filed May 23, 1985 now abandoned, and assigned in common herewith.

BACKGROUND OF THE INVENTION

1. Field of the Invention

This invention relates generally to a digital signal transmitting system for use with, for example, a wire or cable television system having many television receivers as terminals and, in particular, is directed to a digital signal transmitting system in which descramble control data is transmitted to each television receiver by using a service bit signal.

2. Description of the Prior Art

A digital signal transmitting system has been proposed for transmitting a digital signal reproduced from a so-called compact disc or the like by using a CATV (cable television) transmission line. Such a system is disclosed, for example, in U.S. Pat. No. 4,656,629 ("Digital Signal Transmitting and/or Receiving System") filed Nov. 6, 1984, and which is assigned to the same assignee as the present application.

The above-mentioned digital signal transmitting system includes a signal generator for producing time division-multiplexed digital audio signals and service bit signals, a modulator for modulating a carrier in accordance with the time division-multiplexed signals and a transmitter to transmit the modulated carrier through a CATV transmission line. At a receiver or terminal, the service bit signals are decoded so as to control the channel change-over or selection of a television receiver to a vacant channel when an emergency broadcast signal is transmitted. A muting control circuit is also provided to mute an audio signal from a D/A (digital-to-analog) converter.

However, in such previously proposed digital signal transmitting system, although an address signal of a terminal is time division-multiplexed on service bit signals and then transmitted, if the number of the terminals is increased, the addressing or accessing speed is lowered. Therefore, a system which can address a large number of terminals, for example, one million terminals, at high speed has not yet been proposed.

Further, in a pay channel CATV system, scrambled data is transmitted to the receiver, but it has not yet been proposed to transmit a descramble key code to each terminal together with an address number of that terminal.

OBJECTS AND SUMMARY OF THE INVENTION

Accordingly, it is an object of this invention to provide a digital signal transmitting system capable of selectively addressing a large number of terminals at high speed.

Another object of this invention is to provide a digital signal transmitting system in which a control signal for identifying a terminal number, a group number, a tier level and the like is transmitted on the service bit of a first or odd-numbered frame, while a scramble key code is transmitted on the service bit of a second or even-numbered frame.

A further object of this invention is to provide a digital signal transmitting system, as aforesaid, in which a control signal for determining a group number, a channel number or kinds of data is transmitted on the service bit of a second or even-numbered frame to thereby control a terminal at high speed.

According to one aspect of the present invention, there is provided a digital signal transmitting system comprising: a digital signal generator for producing digital information signals, for example, representing music or digital data; a control signal generator for producing a frame synchronizing signal and service bit signals; time division-multiplexing means for producing a composite digital signal including the frame synchronizing signal, service bit signals and digital information signals, said service bit signals being arranged so that different first and second control signals are transmitted in each different frame of the composite digital signal; and means modulating said composite digital signal on a carrier for transmission thereby through a transmission line.

According to another aspect of the present invention, there is provided a digital signal transmitting and receiving system including a central unit and a plurality of terminal units in communication with said control unit through a transmission line, said central unit comprising: a digital signal generator for producing digital information signals representing music or digital data; a control signal generator for producing a frame synchronizing signal and service bit signals; time division-multiplexing means for producing a composite digital signal including said frame synchronizing signal, service bit signals and digital information signals, said service bit signals being arranged so that at least different first and second control signals are transmitted in alternating, for example, odd-numbered and even-numbered frames of the composite digital signal; and means modulating said composite digital signal on a carrier for transmission thereby through a transmission line; and each said terminal unit comprising: a demodulator supplied with the transmitted modulated signal to demodulate said composite digital signals therefrom; means separating said first and second control signals from the demodulated digital signal for control of operation of the respective terminal unit; and de-multiplexing means supplied with said demodulated composite digital signal to provide therefrom said digital information signals which are D/A (digital-to-analog) converted into a respective analog signal.

The above, and other objects, features and advantages of the present invention, will become apparent from the following detailed description taken in conjunction with the attached drawings.

BRIEF DESCRIPTION OF THE DRAWINGS

FIGS. 1A and 1B are tables showing a word format for a composite digital signal that is used in a system according to this invention;

FIG. 2 is a similar table showing a frame format for the composite digital signal used in the system according to this invention;

FIGS. 3A to 3E and FIG. 4 are tables showing respective examples of various control signals that are transmitted on service bits;

DETAILED DESCRIPTION OF THE PREFERRED EMBODIMENTS

Figure 4:
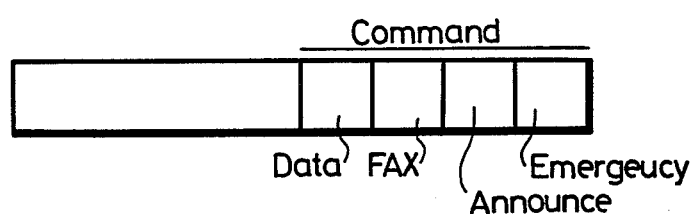

Referring to the drawings in detail, the signal or data format used in accordance with this invention will be first described with reference to FIGS. 1 to 6.

As shown in FIGS. 1A and 1B, in such data format, each word is formed of 168 bits and comprises a word synchronizing signal "Word Sync", for example, of 8 bits, a service bit signal portion "SB" formed of 4 bits $SB_1$ to $SB_4$, a data portion "DATA" of 128 bits (providing 4 channels of data with each channel being formed of 32 bits), and an error check code "ECC" of 28 bits (with the error check code for each of the 4 channels being formed of 7 bits). As shown in FIG. 1B, in the data portion of 128 bits and the error check code ECC of each word, the data DATA and error check code ECC of each channel are respectively re-arranged at every bit, that is, the data and error check codes for the several channels are subjected to so-called bit- interleaving processing.

FIG. 2 shows that, in a data format of a frame of a digital signal used in accordance with this invention, each frame is formed of 256 words, with each word having the data format shown in FIGS. 1A and 1B. As shown more particularly in FIG. 2, in each frame, the first word is formed of a frame sync signal "Frame Sync", service bits SB, data DATA and an error check code ECC, and the second word is formed of a word sync signal "Word Sync (1)", service bits SB, data and an error check code ECC. In like manner, a third word is formed of a word sync signal "Word Sync (2)", service bits SB, data and an error check code ECC. Similarly, the last or 256th word is formed of a word sync signal "Word Sync (255)", service bits SB, data DATA and an error check code ECC.

In this connection, the service bits portion of 4 bits assigned to each word aggregates 1024 bits per frame. In other words, there are 256 of each of the service bits $SB_1$ to $SB_4$ in each frame. Therefore, in accordance with this invention, there are 256 of each of the service bits $SB_1$ to $SB_4$ available to transmit control data for each television receiver or terminal unit, as will be further described later.

Five kinds of frame formats in which the service bits SB are used to transmit control data are shown in FIGS. 3A to 3E. More particularly, a unique service format (USF) is shown in FIG. 3A, a group service format (GSF) is shown in FIG. 3B, a channel service format (CSF) is shown in FIG. 3C, an all service format (ASF) is shown in FIG. 3D, and a scrambling key code format (SKF) is sown in FIG. 3E.

In each of FIGS. 3A to 3E, the legend "Header" refers to a portion of the format which identifies the kind of the respective format; and, in each of FIGS. 3A,3B,3D and 3E, the legend "Command" refers to the portion of the format by which a television receiver is commanded to operate. In FIGS. 3A and 3B, the legend "Group No." refers to the number of a group of receivers having a common characteristic, such as, the area in which the television receivers are situated, or the occupations of the subscribers, or the like. In FIG. 3A, the legend "Terminal No." refers to the address number assigned to a particular television receiver. In FIGS. 3A and 3C, the legend "Tier Level" refers to the condition of the contract for the respective subscriber or television receiver. For example, if the "Tier Level" of the contract is below a predetermined level, the television receiver covered by such contract will be able to receive a broadcast or transmitted signal which is being transmitted on a data channel, such as, a music broadcasting channel, identified in the portion of the format indicated by the legend "Channel No." on FIG. 3C. Finally, in FIG. 3E, the legend "Scramble Key Code" identifies a portion of the respective format in which will appear scramble key data, for example, data representing an initial value of an M-sequence code used for descrambling data, as hereinafter described. Of course, in each of FIGS. 3A to 3E, the legend ECC designates an error check code. The "Command" indicated on FIGS. 3A, 3B,3D and 3E, may be any one of the commands shown on FIG. 4, that is, a command "Emergency", to start emergency broadcasting a command "Announce", to announce broadcasting, a command "FAX" to start facsimile reception, or a command "DATA" to start the loading of data.

Figure 5:
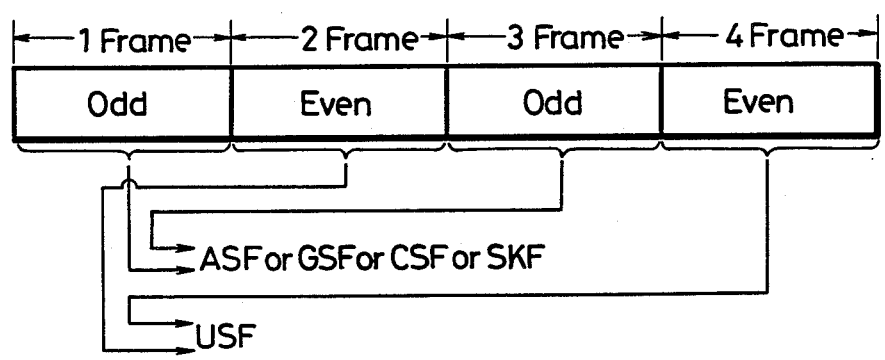
FIG. 5 is a table showing an example of types of control signals which are transmitted in a frame sequential manner.
Figure 6:
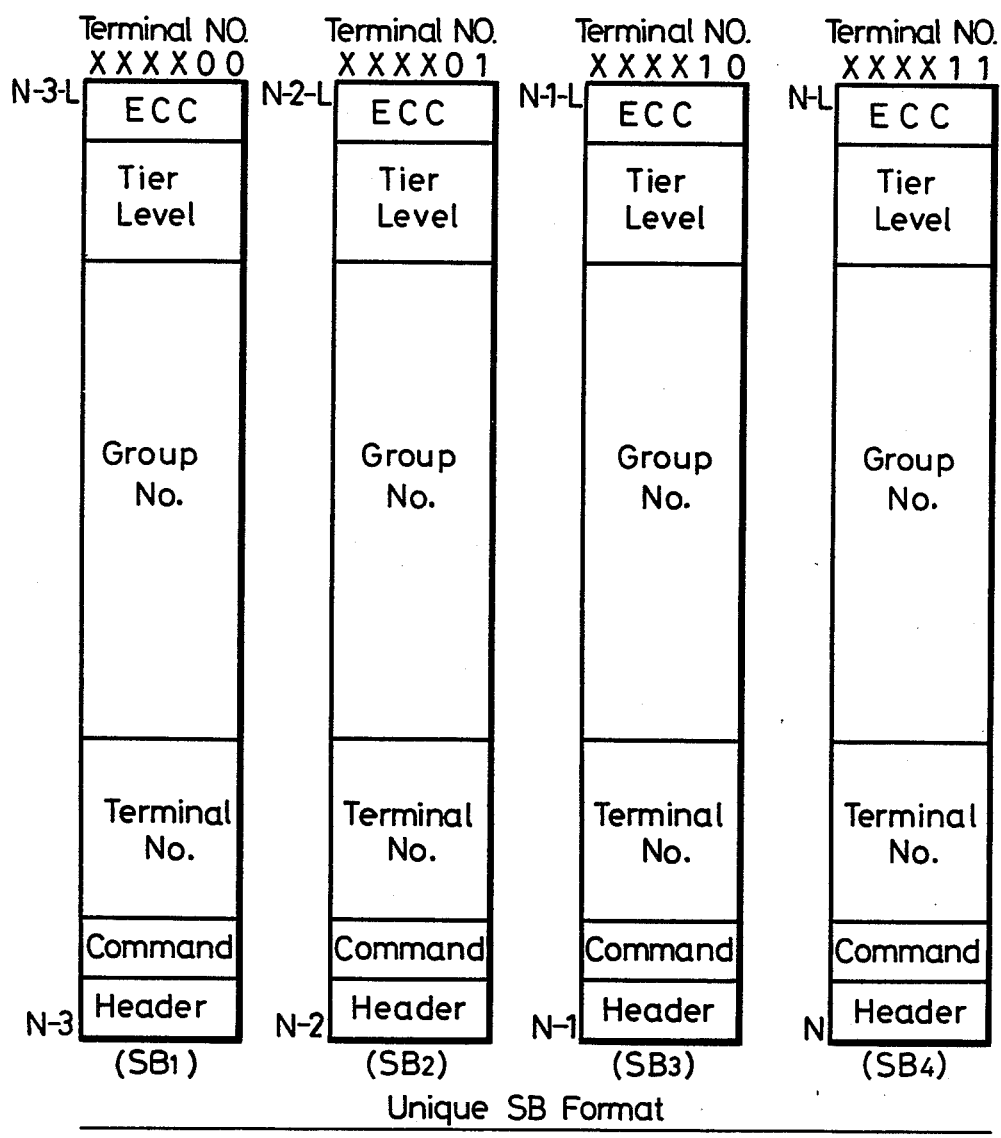
FIGS. 6A to 6D are tables showing examples in which a unique service, format is transmitted on different service bits.

As indicated on FIG. 5, during the first or an odd-numbered frame, the formats ASF (FIG. 3D), GSF (FIG. 3B), CSF (FIG. 3C) and SKF (FIG. 3E) are delivered alternately, while, during the second or even-numbered frame, the format USF (FIG. 3A) is delivered alone. The manner in which the unique service format (USF) of FIG. 3A is assigned to each television receiver in a memory is illustrated in FIGS. 6A to 6D. Thus, for example, when the "Terminal No." identifying a television receiver is expressed as "00" in the lower or two least significant bits of a binary code expression, the unique service format of FIG. 6A is assigned to that receiver in the memory for transmission on a service bit $SB_1$. Similarly, when the "Terminal No." is expressed as "01", the unique service format shown in FIG. 6B is assigned to the respective receiver in the memory for transmission on a service bit $SB_2$; when the "Terminal No." is "10", the unique service format shown in FIG. 6C is assigned to the memory for transmission on service bit $SB_3$; and, when the "Terminal No." is "11", the unique service format shown in FIG. 6D is assigned to the memory for transmission on service bit $SB_4$. It is of course to be noted that the four unique service formats (USF) illustrated on FIGS. 6A to 6D, respectively, are different in their contents with the exception of the headers thereof which merely identify the formats as being of the USF type. In each of FIGS. 6A to 6D, the reference letter N indicates an address in the memory, and the reference letter L indicates the length of the respective unique service format.

The manner in which control data for controlling a receiver are added to the service bits will be described separately for the transmitter and the receiver.

As will be further described later, at the transmitter, there are provided five memories, for example, memories 17a,17b,17c (FIG. 7A) corresponding to the all service format (ASF), the channel service format (CSF), and the scrambling key format (SKF), respectively, a group information memory 18 corresponding to the group service format (GSF), and a unique information memory 19 corresponding to the unique service format (USF). As described above with reference to FIG. 5, the data in the several formats is transmitted alternately at every frame. In order that the data of any of service memories 17a to 17c and group service memory 18 can be received when the receiver selects any of the service bits $SB_1$ to $SB_4$, the same type of format is transmitted on the service bits $SB_1$ to $SB_4$. When the unique service format (USF) is added to the service bits and then transmitted, the memory map for the individual information is as shown in FIG. 3A. As described above, the service bit $SB_1$ has added thereto the unique service format (USF) shown in FIG. 6A, the service bit $SB_2$ has added thereto the unique service format (USF) shown in FIG. 6B, the service bit $SB_3$ has added thereto the unique service format (USF) shown in FIG. 6C, and the service bit $SB_4$ has added thereto the unique service format (USF) shown in FIG. 6D. When the unique service format is added to the service bit and the data is addressed at high speed, the unique service format is transmitted in an even frame period as shown in FIG. 5. Thus, the cycle of the unique service format in FIG. 3A can become long depending on the number of television receivers. However, when each individual receiver or terminal is also identified by a group number which is a relatively low number (for example, one group contains 10,000 terminals) group service format contains vacant spaces, as in FIG. 3B so that the cycle of the group service format is very much shorter than that of the unique service format, and transmission at high speed becomes possible.

On the other hand, at the receiver side, only that one of the service bits $SB_1$ to $SB_4$ corresponding to the address number (Terminal No.) of the receiver is input thereto. More particularly, when the lower 2 bits of the address number of the receiver are "00", only the service bit $SB_1$ is input thereto. Similarly, when the lower 2 bits of the address are "01", only the service bit $SB_2$ is input, when they are "10", only the service bit $SB_3$ is input and when they are "11", only the service bit $SB_4$ is input to the receiver.

Such service bit corresponding to the address number of the receiver is input thereto within one frame period in synchronism with the frame sync signal. At such time, since the service bit is transmitted in the serial format, the sampling of data and the error checking of data can easily be carried out by utilizing the serial port of a microcomputer or microprocessor constituting a controller at the receiver side.

Of the service bits sampled in the one frame period, the data portion, with the exception of the start bit and stop bit, is produced and its data format is as shown in the respective one of FIGS. 3A to 3E. In other words, the data sampled in a frame period will be in accordance with one of the formats shown in FIGS. 3A to 3E. As earlier noted with reference to FIG. 5, the unique service format (USF) and the other service formats (GSF,CSF,ASF and SKF) are alternately transmitted and these formats are discriminated from one another by the header that is inserted in the start portion of each format.

Next, a description will be given of the signal processing that is carried out when each format is received. In the case when the unique service format (USF) shown in FIG. 3A is received, a receiver having an address number coincident with that specified by the (Terminal No.) of the format (USF) memorizes the group number specified by the (Group No.) and the level specified by the (Tier Level) and executes the processing specified by the (Command).

When the group service format (GSF) shown in FIG. 3B is received, all receivers belonging to the specified (Group No.) carry out the signal processing specified by the (Command). In other words, the receivers in which there has been stored the group number specified by the unique service format (USF) and which is coincident with the group number specified by the group service format (GSF) carry out the signal processing specified by the (Command).

When the channel service format (CSF) is received, the tier level of the data channel (music broadcasting and so on) to be transmitted by the system embodying this invention is specified in all the receivers. Service for the user is commenced only when the tier level of the channel selected by the user coincides with the tier level specified by the unique service format (USF) and which has been stored therein.

In the case of the all service format (ASF), the processing corresponding to the specified command is carried out regardless of the Terminal No. In the case of the scramble key format (SKF), the data is descrambled by the specified scramble key code. It is to be noted that the above-described scramble key format (SKF) may be transmitted as a part of the all service format (ASF).

Figure 7:
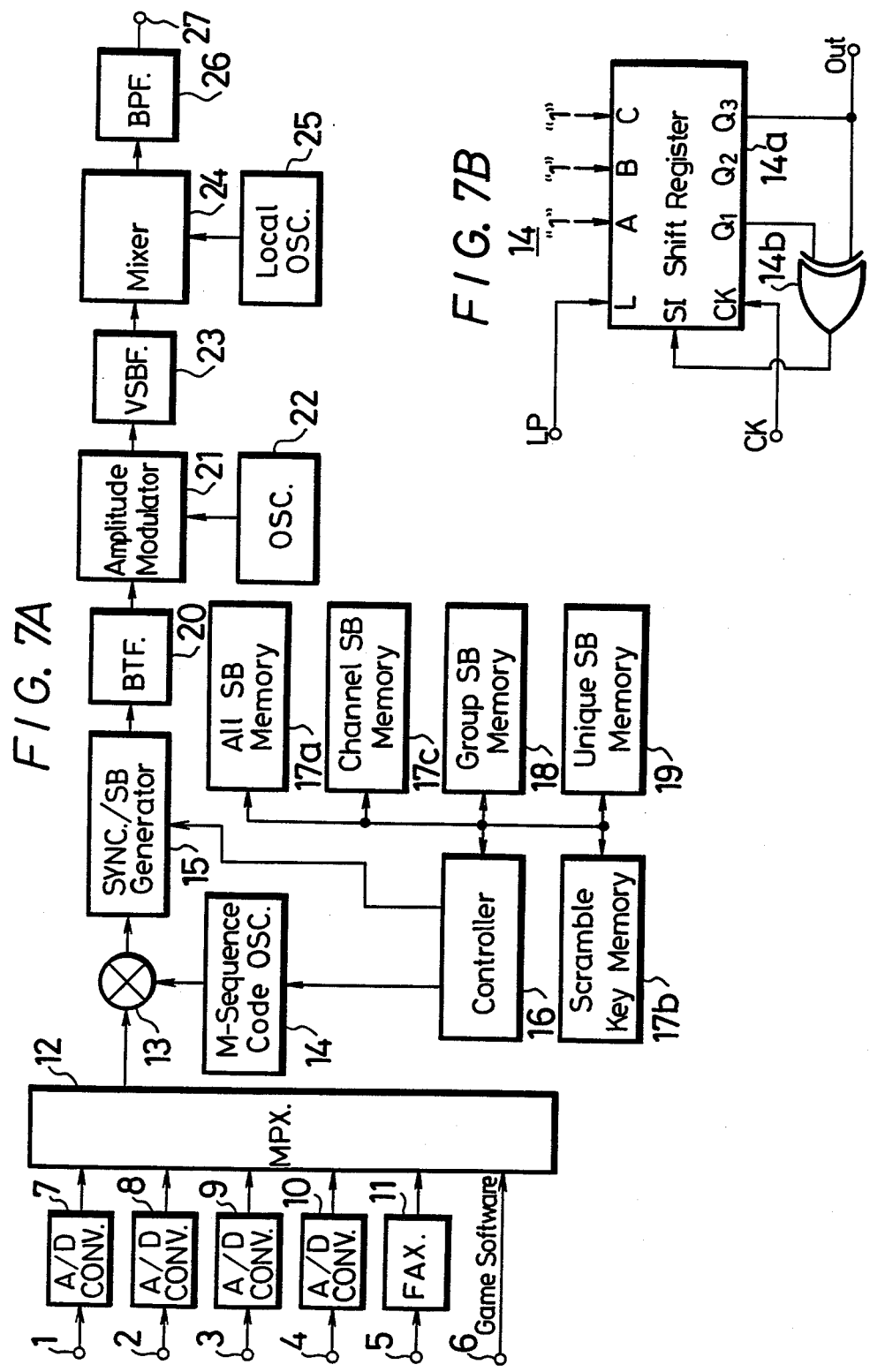
FIG. 7A is a circuit block diagram showing an embodiment of a transmitter according to this invention.
FIG. 7B is a circuit block diagram showing details of an important component of the transmitter shown in FIG. 7A.

Referring now to FIG. 7A, it will be seen that, in the transmitting side of a system according to the invention, analog information or data, for example, constituting a stereo music signal, is supplied to input terminals 1 and 2. Analog information or data comprised of broadcast communications and announcements is supplied to input terminals 3 and 4. Facsimile information or data is supplied to an input terminal 5, and digital information or data, such as that constituting game software and the like, is supplied to an input terminal 6. The analog data from input terminals 1 to 4 are supplied to, and converted to digital signals by, analog-to-digital converters (hereinafter simply A/D converters) 7 to 10, respectively. The respective digital signals are applied to a multiplexer 12, while the facsimile signal from input terminal 5 is also supplied through a facsimile interface circuit 11 to multiplexer 12. The digital data from input terminal 6 is supplied as is to multiplexer 12. In multiplexer 12, the input signals are distributed into respective individual channels and subjected to signal processings, such as, the addition of error check codes, bit-interleaving and so on and then delivered therefrom.

The output signal from multiplexer 12 is supplied to one input terminal of a multiplier 13 and therein multiplied with an M-sequence code signal supplied to another input terminal of multiplier 13 from an M-sequence code oscillator 14. Thus, the output signal from multiplexer 12 is scrambled. If n is taken as the stage number of shift register in the M-sequence code oscillator 14, the latter has $2^n-1$ bits as the length of its maximum sequence. As shown more particularly in FIG. 7B, M-sequence code oscillator 14 comprises a shift register 14a which is formed of a D-type flip-flop, for example, of three stages, and a logic circuit which feeds back a logic value representative of the state of each stage to input terminal SI of the shift register 14a. Such logic circuit is shown to include an exclusive-OR (hereinafter referred to as EOR) circuit 14b. In the illustrated case, the M-sequence code oscillator 14 produces an M-sequence code of seven cycles, each cycle being represented as "1110100". The frequency of the clock signal supplied to the clock terminal CK for use in shifting register 14a is set properly and the initial phase of the M-sequence code is determined by a frame synchronizing pulse that is supplied from a terminal LP to the load terminal L of shift register 14a.

More specifically, during a period in which the frame synchronizing pulse is supplied from terminal LP to load terminal L of shift register 14a, if the clock signal is supplied from terminal CK to the clock terminal of shift register 14a, in synchronism with an edge, for example, the rising edge of the clock signal, a predetermined preset signal, for example, "111" is set at preset terminal A,B and C of shift register 14a. Thus, the frame synchronizing pulse and a PN (pseudo noise) code of the M-sequence code oscillator 14 are in phase coincidence with each other.

The output pulse of seven cycles, such as, "1110100", produced from the M-sequence code oscillator 14 is multiplied with the output of multiplexer 12 so that the multiplier 13 produces data scrambled by the M-sequence code.

The data and error check code thus scrambled is supplied to a sync/SB (service bit) generator 15 in which the synchronizing signal and the service bits are added to the scrambled data and error check code. At this time, under the control of a controller 16 which may be a microcomputer or microprocessor, outputs from memories 17a,17b,17c,18 and 19 are respectively fed to the sync/SB generator 15 and there selectively added to the service bits. Further, the initial value (scramble key data) of the M-sequence code oscillator 14 is set by controller 16 in synchronism with the frame synchronizing signal. This initial value is changed constantly from time to time in order to increase security. A detailed description of the operation of controller 16 is provided below in connection with FIG. 9.

The output signal from generator 15, that is, the signal having the synchronizing signal and the service bits inserted into the data, is supplied through a binary transversal filter 20 to an amplitude (A/M) modulator 21. The filter 20 is used as an equalizer for matching the frequency characteristics of the whole transmitting-receiving system, thereby to remove inter symbol interference. In A/M-modulator 21, the carrier from an oscillator 22 is modulated by the output signal from filter 20. Accordingly, modulator 21 produces, at its output, an intermediate frequency signal and this signal is supplied through a vestigial side-band filter 23 to a mixing circuit 24. In mixing circuit 24, the intermediate frequency signal is mixed with the local oscillation frequency signal from a local oscillating circuit 25 and is thereby frequency-converted. Thus, there is produced, at the output side of mixing circuit 24, a signal indicative of a difference between the local oscillation signal and the intermediate frequency signal. The local oscillation frequency of local oscillating circuit 25 is set higher than a transmitting frequency of a desired channel by the value of the intermediate frequency. Accordingly, the transmission channel is determined by selected the local oscillation frequency.

The output signal from mixing circuit 24 is delivered through a band-pass filter 26 to an output terminal 27 and the signal developed at the output terminal 27 is transmitted to a so-called head end (not shown) of the cable or CATV system. The signal from the head end is transmitted through a CATV transmission line (not shown) to the receiving side.

Figure 8:
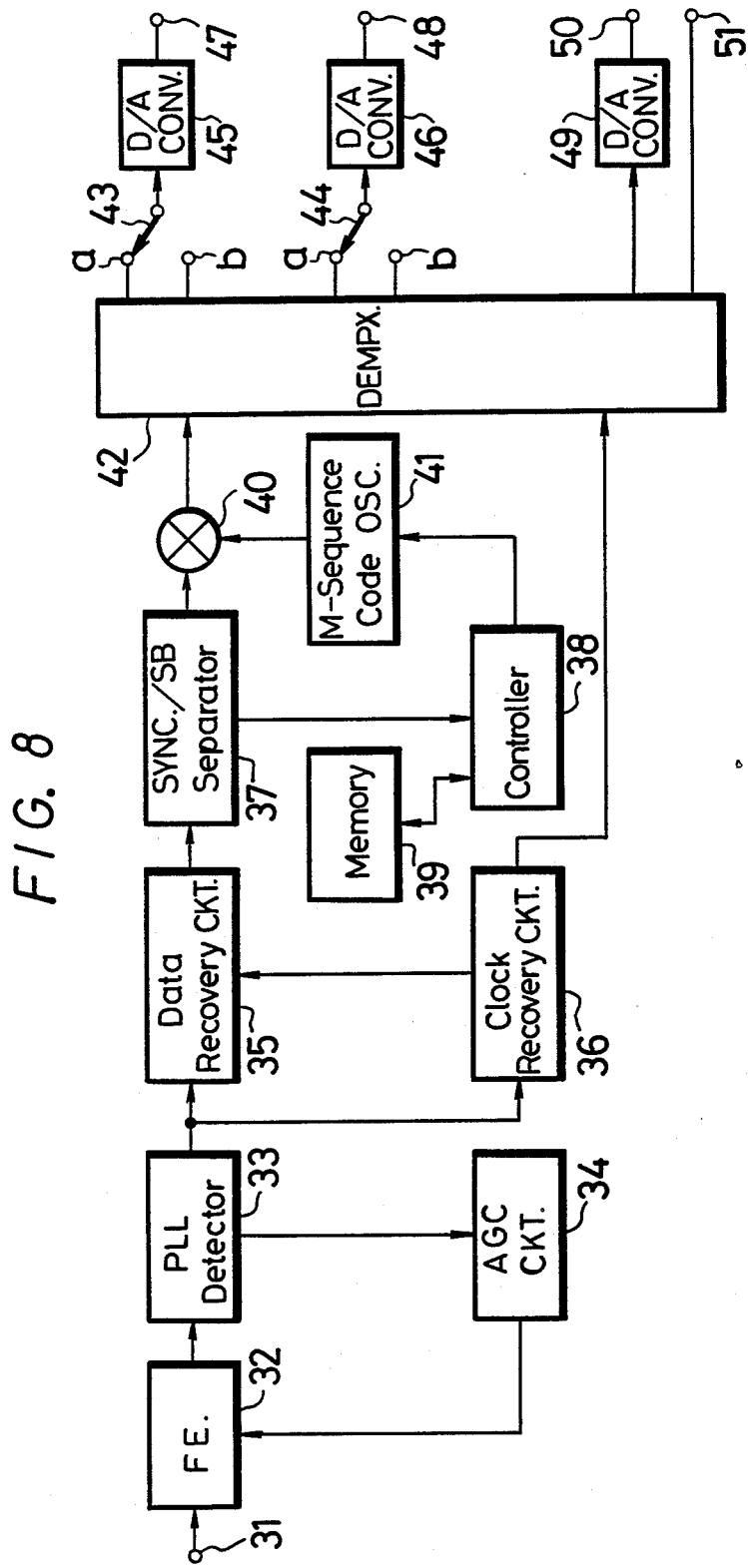
FIG. 8 is a circuit block diagram showing an embodiment of a receiver or terminal unit according to this invention.

As shown on FIG. 8, the signal transmitted through the CATV transmission line is supplied through an input terminal 31 at the receiving side to a front end 32 in which it is amplified and then converted to an intermediate frequency signal of a predetermined frequency. This intermediate frequency signal is supplied to an AM detector, for example, a PLL (phase-locked loop) detector 33, which then demodulates a base band signal. Although the detector may be of the type of Am detector that is normally used in a standard television system, it is preferable to use the mentioned PLL detector 33 in order to avoid any waveform distortion.

A part of the output signal from PLL detector 33 is supplied to an AGC (automatic gain control) circuit 34 which applies an automatic gain control signal to front end 32.

The output from the PLL detector 33 is supplied to a data recovery circuit 35 in which, on the basis of a clock signal reproduced from the output of the PLL detector 33 by a clock recovery circuit 36, the level of the input signal to circuit 35 is discriminated by the center level of an eye pattern to thereby produce digital data. The data thus produced or recovered in circuit 35 is supplied to a succeeding sync/SB separator 37 in which the synchronizing signal and the service bits are separated from the data and supplied to a controller 38. The controller 38 which is desirably a microprocessor or microcomputer is adapted to carry out various control operations in synchronism with the synchronizing signal and the control data added to the service bit is stored through the controller 38 in a memory 39.

The data output from the sync/SB separator 37 is supplied to one input terminal of a multiplier 40 and multiplied in the latter by an M-sequence code signal supplied to the other input terminal of multiplier 40 from an M-sequence code oscillator 41 which may be similar to M-sequence code oscillator 14 of FIG. 7B. By reason of the foregoing, the data is descrambled and delivered from multiplier 40. In M-sequence code oscillator 41, by changing the initial value of the M-sequence code under the control of controller 38, such initial value is set in frame-synchronism with the transmitter side.

The data from multiplier 40 is supplied to a de-multiplexer 42 in which it is subjected to signal processing, such as, rearrangement of data (bit-deinter-leaving), error correction and so on. The digital signals from de-multiplexer 42 are supplied through switches 43 and 44 to digital-to-analog (D/A) converters 45 and 46, respectively, in which they are converted from digital-to- analog signals and then delivered to output terminals 47 and 48, respectively. When switch 43 is changed-over from its fixed contact a to its fixed contact b, a signal corresponding to data from input terminal 1 (FIG. 7A) at the transmitting side is replaced by, or changed-over with a signal corresponding to data from input terminal 2 (FIG. 7A) in response to an address signal from de-multiplexer 42 in a time-division manner. When switch 44 is changed-over from its fixed contact a to its fixed contact b, the signal corresponding to the data from input terminal 3 (FIG. 7A) and the signal corresponding to the data from input terminal 4 (FIG. 7A) are selectively changed over by the address signal from de-multiplexer 42 in a time-division manner.

On the other hand, if a facsimile signal is obtained from de-multiplexer 42, such facsimile signal is delivered through a facsimile interface circuit 49 to an output terminal 50. Similarly, digital data, such as game software and so on, is directly delivered from de-multiplexer 42 to an output terminal 51.

Figure 9:
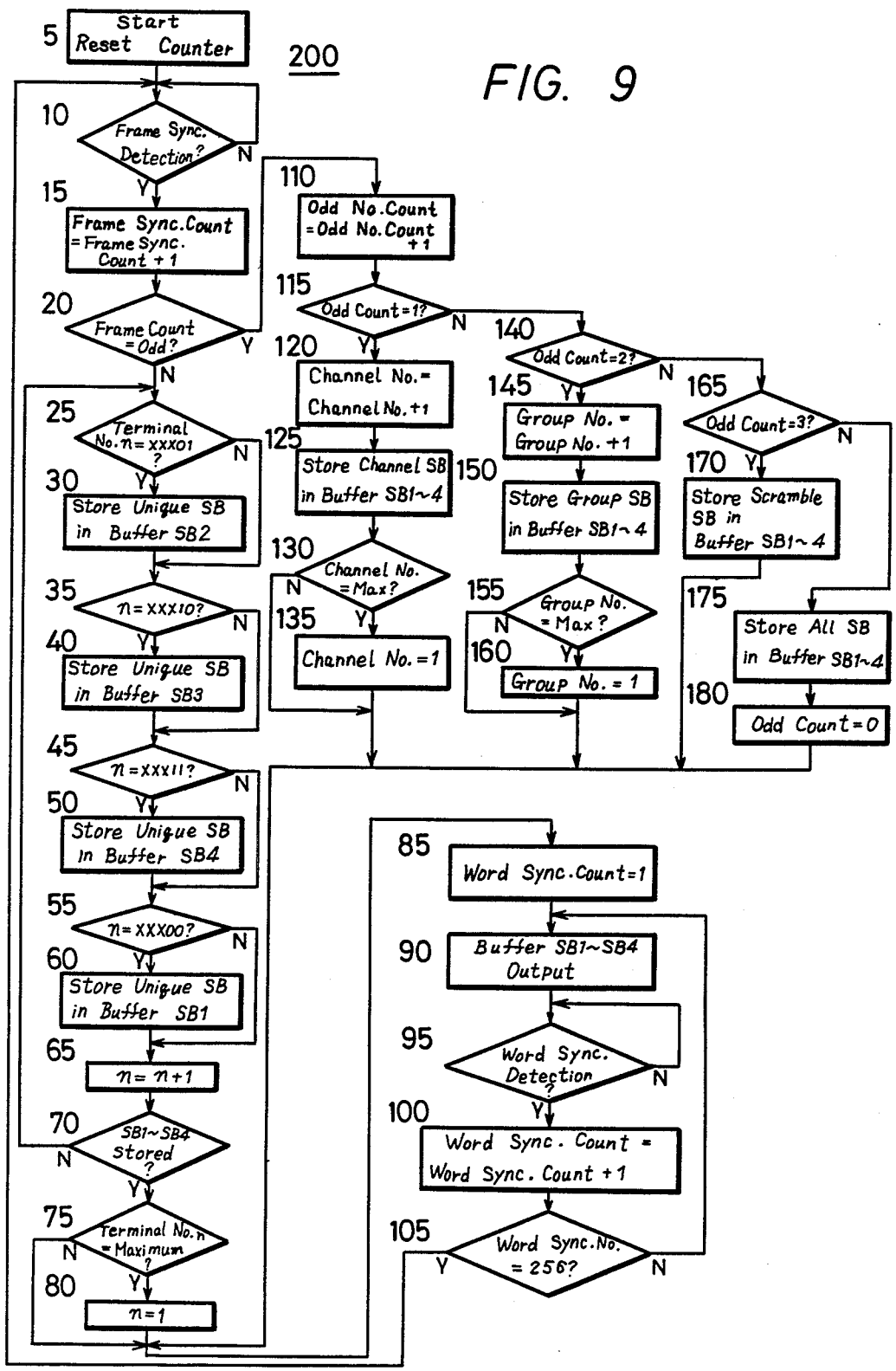
FIG. 9 is a flowchart for the operation of a controller of the transmitter shown in FIG. 7A.

The operation of controller 16 (FIG. 7A) in providing the outputs from memories 17a, 17b, 17c, 18 and 19 to sync/SB generator 15 will now be described in connection with FIG. 9, which is a flowchart of the operation of controller 16. As stated above, controller 16 may be a microcomputer or microprocessor operative under a routine 200 stored in a ROM (read only memory) to execute the steps illustrated in FIG. 9.

It is assumed in the following discussion that controller 16 includes a frame sync counter, a word sync counter, a channel number counter, a group number counter, and an odd number counter for providing the corresponding counts. Of course, such counters may be simulated within a microprocessor by means of software.

Routine 200 begins in step 5, wherein the count of the frame sync counter, word sync counter, channel number counter, group number counter and odd number counter are all reset to initialize the system. Then in step 10, the frame sync signal (FIG. 2) of the first frame is detected, and in step 15, the count of frame sync counter is incremented by 1. In step 20, it is detected whether the frame sync count is odd or even so that, as discussed above in connection with FIG. 5, it may be determined whether the formats ASF, GSF, CSF and SKF are to be delivered alternately to the odd numbered frames, or whether the format USF is to be delivered to the even numbered frames. At this time in step 20, the frame sync count equals 1, an odd number, so that routine 200 proceeds to step 110, where the count of the odd number counter is incremented by 1. Then in step 115, it is detected whether the odd count of the odd number counter equals 1. In this pass through, the odd count equals 1, so the routine moves to step 120, wherein the count of the channel number counter is incremented by 1. Then in step 125, the channel SB format, as illustrated in FIG. 3C, is read from channel memory 17c and stored in four buffers SB1', SB2', SB3', SB4' within controller 16. Then in step 130, it is detected whether the count of the channel number counter has reached a predetermined maximum value, corresponding to the total number of allowed channels. If so, the channel number is initialized in step 135, and then routine 200 moves to step 85.

In step 85, the count of the word sync counter is set to 1, since, as is illustrated in FIG. 2, the first frame sync signal is equivalent to the first word sync signal. Then in step 90, the contents of buffers SB1'–SB4' are output to sync/SB generator 15 (FIG. 7A). Then in step 95, the presence of the next word sync signal is detected, with routine 200 remaining at step 95 until the next word appears. At such time, the word sync count of the word sync counter is incremented by 1 in step 100, and in step 105 it is detected whether the word sync number is equal to 256, i.e. whether all 256 words of the first frame have been received. As each word within the frame is received, routine 200 cycles through steps 90, 95, 100 and 105, continuously supplying the contents of buffers SB1'–SB4' to each word, as described above. However, after the 256th word has been received, routine 200 moves from step 105 back to step 10 to detect the next incoming frame sync signal. The frame sync count of the frame sync counter is incremented to 2 in step 15, so that now in step 20 the frame sync count is detected as even, and routine 200 now moves to step 25.

In step 25, it is detected whether the last two digits of the terminal number n are "01". If they are, routine 200 moves to step 30, wherein the unique SB format, as illustrated in FIG. 6B, is read from memory 19 and stored in buffer SB2' of controller 16. If the last two bits of the terminal number are not "01", routine 200 moves to step 35, wherein it is detected whether these last two bits are "10". If so, the unique SB format as illustrated in FIG. 6C is read from unique SB memory 19 and stored in buffer SB3'. Similarly, in step 45, it is detected whether the last two digits of the terminal number are "11", and if so, the unique SB format illustrated in FIG. 60 is stored in buffer SB4'. Finally, in step 55, it is detected whether the last two digits of the terminal number are "00", and if so, in step 60, the unique SB format illustrated in FIG. 6A is stored in buffer SB1'. Thus, in each pass through steps 25–60, a single unique SB format will be stored in a predetermined buffer. Then in step 65, the terminal number n is incremented by 1, and in step 70 it is determined whether or not all four buffers SB1'–SB4' have been filled. If not, routine 200 moves back to step 25, so that routine 200 loops a total of four times through steps 25–70 for each even frame to store the four unique SB formats in the four buffers SB1'–SB4', as appropriate. Of course, it will be understood that if more than four types of terminals are included within the system, additional buffers may be added to controller 16, with routine 200 looping through these steps a corresponding number of times. For more than four types of terminals, at least the last three digits of the terminal number n would be utilized, but the manner in which the programming may be extended is readily perceived.

In step 25, it is detected whether the terminal number n has reached its maximum value, and if so, it is initialized to 1 in step 80. Routine 200 then moves to step 85, and as before, the word sync count is initialized to 1 in step 85, the contents of buffers SB1'–SB4' are output to sync/SB generator 15, and routine 200 loops through steps 90 to 105 until all 256 words of this second frame have been received. Then, as before, routine 200 loops back to step 10 to detect the frame sync signal, and to increment the same in step 15.

Now, in step 20, the frame count is three, i.e. odd, and routine 200 moves to step 110, where the odd count is incremented to equal 2. Therefore, routine 200 moves from step 115 to step 140, wherein the odd count equal to 2 is detected, and then to step 145. In step 145, the group number count of the group number counter is incremented, and in step 150, the group SB format as illustrated in FIG. 3B is simultaneously stored in all four buffers SB1'–SB4'. In step 155, it is detected whether the group number count has reached the predetermined maximum number corresponding to the total number of allowed groups, and if so, the group number count is initialized to 1 in step 160. The routine moves to step 85 to initialize the word sync count, and in step 90, the contents of buffers SB1'–SB4', i.e. the group SB format, are output to sync/SB generator 15. Once again, routine 200 loops through the 256 words to provide the group SB format to each, and returns to step 10 to detect the next frame sync signal. Since the frame sync count, as incremented in step 15, is now equal to 4, i.e. even, the routine moves to step 25, for supplying the unique SB format to sync/SB generator 15, as discussed above in connection with frame 2. When the processing of frame 4 is complete, routine 200 moves back to step 10.

The sync signal of frame 5 is detected in step 10 and counted in step 15, so routine 200 moves through step 20 to step 110, wherein the odd number count is incremented by 1 to equal 3. Routine 200 now moves through steps 115 and 140 to step 165, wherein the odd count equal to 3 is detected. Now in step 170, the scramble SB format, as illustrated in FIG. 3E, is read from scramble key memory 17b and is simultaneously stored in all four buffers SB1'-SB4'. Routine 200 then moves to step 85 to initialize the word sync count and in step 90 to supply the scramble SB format to sync/SB generator 15 for all 256 words of frame 5. Routine 200 then moves through steps 10 and 15, wherein the frame sync count is set to 6, and then through steps 20-105, as discussed above in connection with frames 2 and 4.

Routine 200 then again moves to steps 10 and 15 to set the frame sync count to 7 and through step 20 to step 110, where the odd count is incremented by 1 to equal 4. Routine 200 then moves through steps 115, 140, and 165 to step 175, where the all SB format is read from the all SB memory 17a and stored simultaneously in all four buffers SB1'-SB4'. In step 180, the odd count is initialized to zero, and routine 200 moves again to step 85 to initialize the word sync count and to step 90, wherein the all SB format, stored in buffers SB1'-SB4', is supplied to sync/SB generator 15 for all 256 words of frame 7. Routine 200 then loops back to steps 10 and 15 to set the frame sync count to 8. Finally, routine 200 loops through steps 20-105, as discussed above in connection with even numbered frames 2, 4 and 6.

Thus, a total of eight frames, four even and four odd, are processed by routine 200 so that the unique SB format is supplied to all the even frames, and the channel SB format, group SB format, scramble SB format, and all SB format are alternately supplied to the odd numbered frames. The processing of each successive group of eight frames is identical to the processing described above.

The operation of controller 38 in the receiver illustrated in FIG. 8 is directly comparable to the operation of controller 16, discussed in detail just above. In the interest of brevity, a detailed description of controller 38 will not be provided, as the operation thereof is readily understood from the description of the operation of controller 16.

In the system according to this invention as set forth above, since the digital data to be transmitted is bit-interleaved and multiplied with the M-sequence code signal to thereby be scrambled, and the initial value of the M-sequence code signal is changed constantly from time to time, the digital signal transmitting system is simple in circuit arrangement and descrambling is possible only when the receiving side is synchronized with the transmitting side so that digital signal transmission of very high security becomes possible.

Further, since the content of the service bit format is changed at every frame cycle, the scrambling can be effected at high speed. Furthermore, since the descramble key data (scramble key format) is serially transmitted by utilizing the service bit, such data can be descrambled with ease and at high speed in the receiving side.

In addition, since the scramble key data is always transmitted with a cycle shorter than that of the individual data, such as unique service format and so on, the changed scramble key data can be reset immediately.

Although preferred embodiments of the invention have been described above, it will be apparent that the invention is not limited to those precise embodiments, and that many modifications and variations could be effected by one skilled in the art without departing from the spirit or scope of the invention as defined by the appended claims.

What is claimed is:

1. A digital signal transmitting system comprising: a digital signal generator for producing digital information signals; a control signal generator for producing a frame synchronizing signal and service bit signal; time division-multiplexing means for producing a composite digital signal including said frame synchronizing signal, service bit signals and digital information signals, said service bit signals being arranged for continuously transmitting first and second control signals representing a terminal number and a scramble key code, respectively, in alternate frames of the composite digital signal; and means modulating said composite digital signal on a carrier for transmission thereby through a transmission line.

2. A digital signal transmitting system according to claim 1 in which said first control signal is transmitted in each even-numbered frame of said composite digital signal and said second control signal is transmitted in each odd-numbered frame of said composite digital signal.

3. A digital signal transmitting system according to claim 2 in which said scramble key code is an M-sequence code.

4. A digital signal transmitting system according to claim 2, further comprising means for constantly changing said scramble key code from time to time.

5. A digital transmitting system according to claim 2; in which said service bit signals further include a third control signal representing a group number transmitted in a frame for transmitting said scramble key code.

6. A digital signal transmitting system according to claim 2; in which said service bit signals further include a third control signal representing a channel number transmitted in a frame for transmitting said scramble key code.

7. A digital signal transmitting system according to claim 2, in which said service bit signal further include a third control signal which selectively indicates an announce, emergency or data signal mode transmitted in a frame for transmitting said scramble key code.

8. A digital signal transmitting and receiving system including a central unit and a plurality of terminal units in communication with said central unit through a transmission line, said central unit comprising: a digital signal generator for producing digital information signal; a control signal generator for producing a frame synchronizing signal and service bit signals; time division-multiplexing means for producing a composite digital signal including said frame synchronizing signal, service bit signals and digital information signals, said service bit signals being arranged for continuously transmitting at least different first and second control signals representing a terminal number and a scrambled key code, respectively, in alternate frames of the composite digital signal; and means modulating said composite digital signal on a carrier for transmission thereby through said transmission line; and each said terminal unit comprising: a demodulator supplied with the transmitted modulated signal to demodulate said composite digital signal therefrom; means for separating said first and second control signals representing said terminal number and said scrambled key code from the demodulated digital signal to control at least a descrambling operation of the respective terminal unit; de-multiplexing means supplied with the demodulated composite digital signal to produce said digital information signals therefrom; and digital-to-analog converting means for converting said digital information signals into an analog signal.

9. A digital signal transmitting and receiving system according to claim 8; in which said first control signal representing said terminal number activates one of said plurality of terminal units.

10. A digital signal transmitting and receiving system according to claim 9; in which said second control signal representing said scrambled key code is multiplied by said demodulated digital signals.

* * * * *